United States Patent [19]
Hlavach et al.

[11] Patent Number: 5,326,459
[45] Date of Patent: Jul. 5, 1994

[54] WASTEWATER TREATMENT APPARATUS

[75] Inventors: Charles R. Hlavach, Wauwatosa; Keith A. Bergemann, Milwaukee, both of Wis.

[73] Assignee: Envirex Inc., Waukesha, Wis.

[21] Appl. No.: 975,281

[22] Filed: Nov. 12, 1992

[51] Int. Cl.⁵ .................................................. C02F 3/08
[52] U.S. Cl. ............................. 210/150; 210/195.1; 210/220; 210/619; 210/903
[58] Field of Search ..................... 210/150, 151, 195.1, 210/259, 220, 202, 619, 903

[56] References Cited

U.S. PATENT DOCUMENTS

| | | | |
|---|---|---|---|
| Re. 29,969 | 4/1979 | Torpey | 210/619 |
| 3,516,929 | 6/1970 | Welch | 210/619 |
| 3,596,767 | 8/1971 | Antonie | 210/96 |
| 3,598,726 | 8/1971 | Welch | 210/619 |
| 3,703,238 | 11/1972 | Torpey | 210/151 |
| 3,704,783 | 12/1972 | Antonie | 210/151 |
| 3,709,364 | 1/1973 | Savage | 210/903 |
| 3,744,634 | 7/1973 | Schlenz | 210/151 |
| 3,817,857 | 6/1974 | Torpey | 210/619 |
| 3,849,304 | 11/1974 | Torpey et al. | 210/619 |
| 3,869,380 | 3/1975 | Torpey | 210/619 |
| 3,871,999 | 3/1975 | Torpey | 210/619 |
| 3,886,074 | 5/1975 | Prosser | 210/150 |
| 3,905,899 | 9/1975 | Torpey | 210/619 |
| 3,930,998 | 1/1976 | Knopp et al. | 210/903 |
| 3,932,273 | 1/1976 | Torpey et al. | 210/619 |
| 4,035,290 | 7/1977 | Torpey | 210/619 |
| 4,090,965 | 5/1978 | Fuchs | 210/151 |
| 4,093,539 | 6/1978 | Guarino | 210/619 |
| 4,179,374 | 12/1979 | Savage et al. | 210/903 |
| 4,211,647 | 6/1980 | Firedman et al. | 210/619 |
| 4,268,385 | 5/1981 | Yoshikawa | 210/150 |
| 4,330,408 | 5/1982 | McClure | 210/619 |
| 4,372,895 | 2/1983 | Saffran | 261/92 |
| 4,399,031 | 8/1983 | Imano et al. | 210/150 |
| 4,468,326 | 8/1984 | Kawert | 210/619 |
| 4,540,491 | 9/1985 | Zimmer | 210/619 |
| 4,549,962 | 10/1985 | Koelsch | 210/150 |
| 4,629,559 | 12/1986 | Smith | 210/150 |
| 4,668,387 | 5/1987 | Davie et al. | 210/150 |
| 4,690,755 | 9/1987 | Friedman et al. | 210/96.1 |
| 4,721,570 | 1/1988 | Ankaitis | 210/619 |
| 4,729,828 | 3/1988 | Miller | 210/150 |
| 4,935,130 | 6/1990 | Sieksmeyer et al. | 210/151 |
| 5,002,659 | 3/1991 | Bidenko et al. | 210/150 |

FOREIGN PATENT DOCUMENTS

| | | |
|---|---|---|
| 1008191 | 5/1977 | Canada . |
| 3016920 | 11/1981 | Fed. Rep. of Germany . |
| 1558876 | 4/1990 | U.S.S.R. . |

*Primary Examiner*—Christopher Upton
*Attorney, Agent, or Firm*—Michael, Best & Friedrich

[57] ABSTRACT

Disclosed herein is a wastewater treatment facility comprising a structure defining first and second tank portions; a shaft rotatably supported by the structure; a first biological reactor in the first tank portion and including a first rotatable biological contactor mounted to the shaft and having a diameter; and a second biological reactor in the second tank portion and including a second rotatable biological contactor mounted to the shaft and having a diameter greater than the diameter of the first rotating biological contactor.

20 Claims, 5 Drawing Sheets

# WASTEWATER TREATMENT APPARATUS

FIELD OF THE INVENTION

This invention relates to the biological treatment of wastewater, and more particularly to wastewater treatment apparatus including rotating biological contactors.

BACKGROUND OF THE INVENTION

Rotating biological contactors commonly comprise a cylindrical structure with a labyrinthine interior designed to provide extensive air/water contact surfaces. The cylinder rotates about a horizontal axis in a secondary wastewater treatment tank. Rotating biological contactors provide surfaces for the growth of biomass which has the ability to absorb, adsorb, coagulate, and oxidize organic constituents of the wastewater.

Wastewater treatment facilities have included rotating biological contactors (RBC's) supported in treatment tanks and rotated partially submerged in wastewater in the treatment tanks so that the surfaces of the contactor are alternately exposed to the wastewater and to oxygen in the overlying atmosphere. A film of wastewater is carried into the air and trickles down the surfaces of the contactor while absorbing oxygen from the air. Organisms in the biomass remove dissolved oxygen and organic materials from the film of wastewater and unused dissolved oxygen in the wastewater film is mixed with the contents of wastewater in the tank.

Anaerobic reactors of wastewater treatment facilities have also included RBC's in treatment tanks. The RBC's of the anaerobic reactors are completely submerged in wastewater and provide denitrification of wastewater in the tank.

Rotating biological contactors can be driven by a motor, or by air as disclosed in U.S. Pat. No. 4,668,387, issued to Davie et al. on May 26, 1987 and incorporated herein by reference or as disclosed in U.S. Pat. No. 3,886,074, issued to Prosser on May 27, 1975 and incorporated herein by reference. In an air drive system, air is released below an RBC via an air header, and rises into air cups provided around the outer perimeter of the RBC. The captured air exerts a buoyant force which exerts a torque on the RBC and shaft sufficient for rotation.

SUMMARY OF THE INVENTION

The invention provides a wastewater treatment facility including a structure defining first and second tank portions, including a shaft supported by the structure for rotation, and rotating biological contactors (RBC's) mounted on the shaft for rotation in the first and second tank portions. One of the RBC's on the shaft has a diameter different from another of the RBC's on the shaft.

One or more of the RBC's are part of reactors having a first oxygen content, and one or more RBC's on the same shaft are part of reactors having a second oxygen content. More particularly, in one embodiment of the invention, the reactors having the first oxygen content are reduced oxygen or anaerobic reactors, and the reactors having the second oxygen content are aerobic reactors. The aerobic reactors are for removal of carbonaceous $BOD_5$ (five day biological oxygen demand—a measure of organic pollution) and for nitrification. The reduced oxygen reactors are for denitrification. The RBC's of the aerobic reactors have larger diameter's than the RBC's of the reduced oxygen reactors. When each RBC of the aerobic reactors is partially submerged in wastewater, each RBC of the reduced oxygen reactors is almost completely submerged (90-100% submerged).

Cost savings are achieved as only one shaft is needed. In one embodiment of the invention, only one tank is employed for further cost savings. The use of RBC's is made more economical for smaller facilities having permit limits for total nitrogen.

In one embodiment of the invention, at least one RBC of the aerobic reactors has air cups thereon, and air is released below those RBC's via a drive air header, and rises into the air cups provided around the RBC. The captured air exerts a buoyant force which exerts a torque on the RBC and shaft. Air cups may, but need not be, provided on the RBC's of the reduced oxygen reactors.

The RBC's of the aerobic and reduced oxygen reactors include radially extending passages, and air cups are not provided over peripheral portions of the RBC's that have radially extending passages, and some air enters the passages and flows upward into those RBC's The advantage of this is that the air provides turbulence and sloughing and controls the thickness of biofilm on the RBC so that a thinner, more biologically active biofilm remains on the RBC. For the RBC's of the aerobic reactors, the air that enters the radially extending passages can be provided via process air headers, spaced from the drive air headers, and under respective RBC's (this is known in the art as dual header aeration). The aeration controls the growth of biomass on the RBC's above each header.

In one embodiment of the invention, aeration is provided to the RBC's of the aerobic reactors, and this produces sufficient torque to rotate the RBC's for both the aerobic and reduced oxygen reactors.

In one embodiment of the invention, flow through the tank is in the direction from the aerobic reactors to the reduced oxygen reactors. $BOD_5$ removal and nitrification ($NH_3$—N is converted to $NO_3$—N) occur in the aerobic reactors. The nitrates enter the reduced oxygen reactors, are oxidized, and release gaseous nitrogen. For this oxidation to occur, a soluble carbon source (e.g. methanol) is provided at the beginning of the reduced oxygen reactors.

In another embodiment of the invention, flow through the tank is in the direction from the reduced oxygen reactors to the aerobic reactors. In this embodiment, influent into the reduced oxygen reactors includes raw, settled waste combined with a recycle stream of fluids that have passed through the aerobic reactors. In this embodiment, wastewater itself provides the soluble carbon source and no additional soluble carbon source is needed. Capacity is provided for a recycle rate of as high as 300–400% recycle.

Other features of the invention will become apparent upon review of the following detailed description of the preferred embodiment, reference being made to the appended drawings.

DETAILED DESCRIPTION OF THE PREFERRED EMBODIMENT

Figure 1:
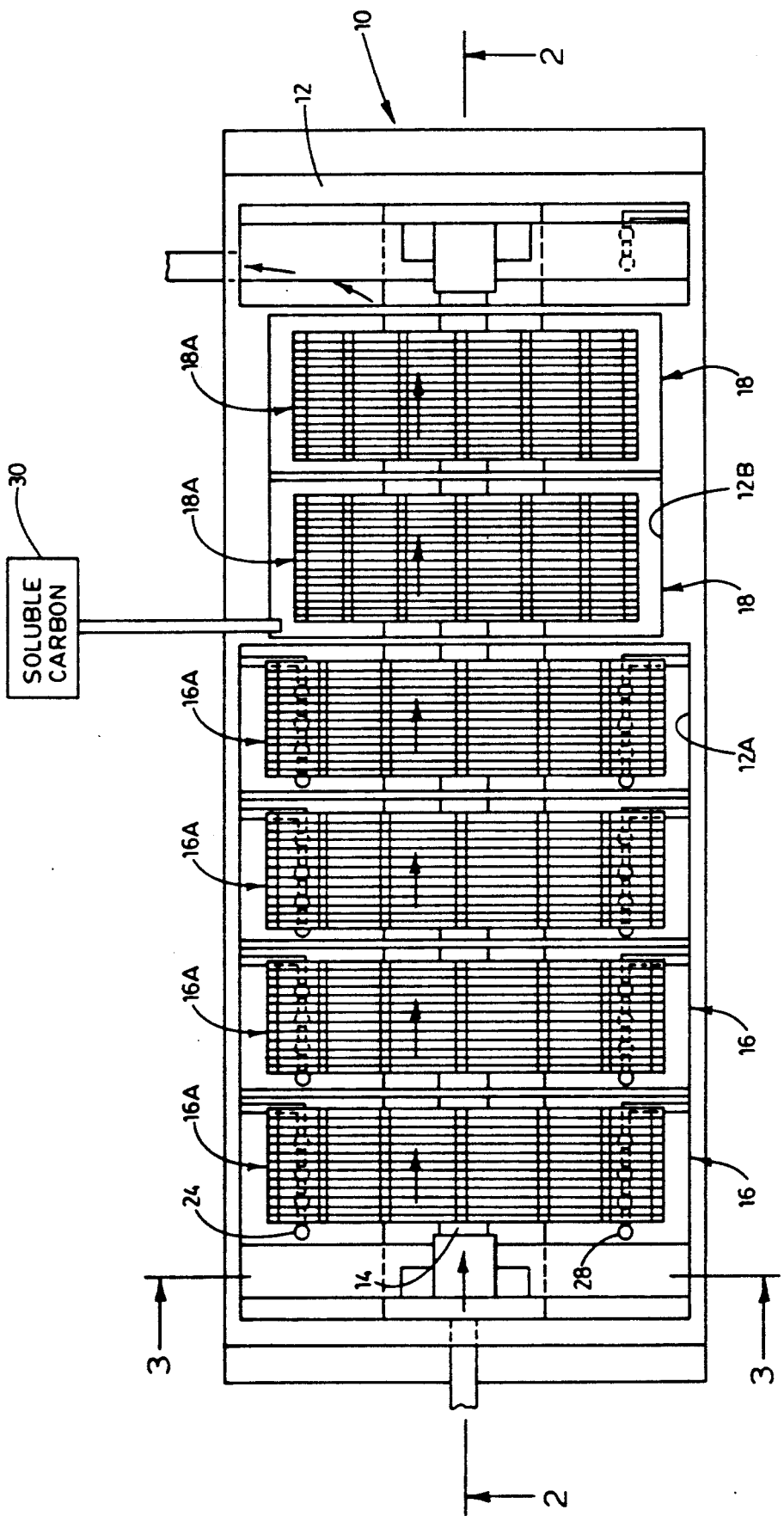
FIG. 1 is top plan view of a wastewater treatment facility embodying various features of the invention.

Shown in FIG. 1 is a wastewater treatment facility 10 including a tank 12 including respective first tanks portions 12A and respective second tank portions 12B, and including a shaft 14 mounted for rotation in the tank 12. The wastewater treatment facility 10 includes rotatable or rotating biological contactors (RBC's) 16A and 18A mounted on the 14 for rotation in the tank portions 12A and 12B, respectively. The RBC's 16A have a diameter different from the RBC's 18B.

Figure 2:
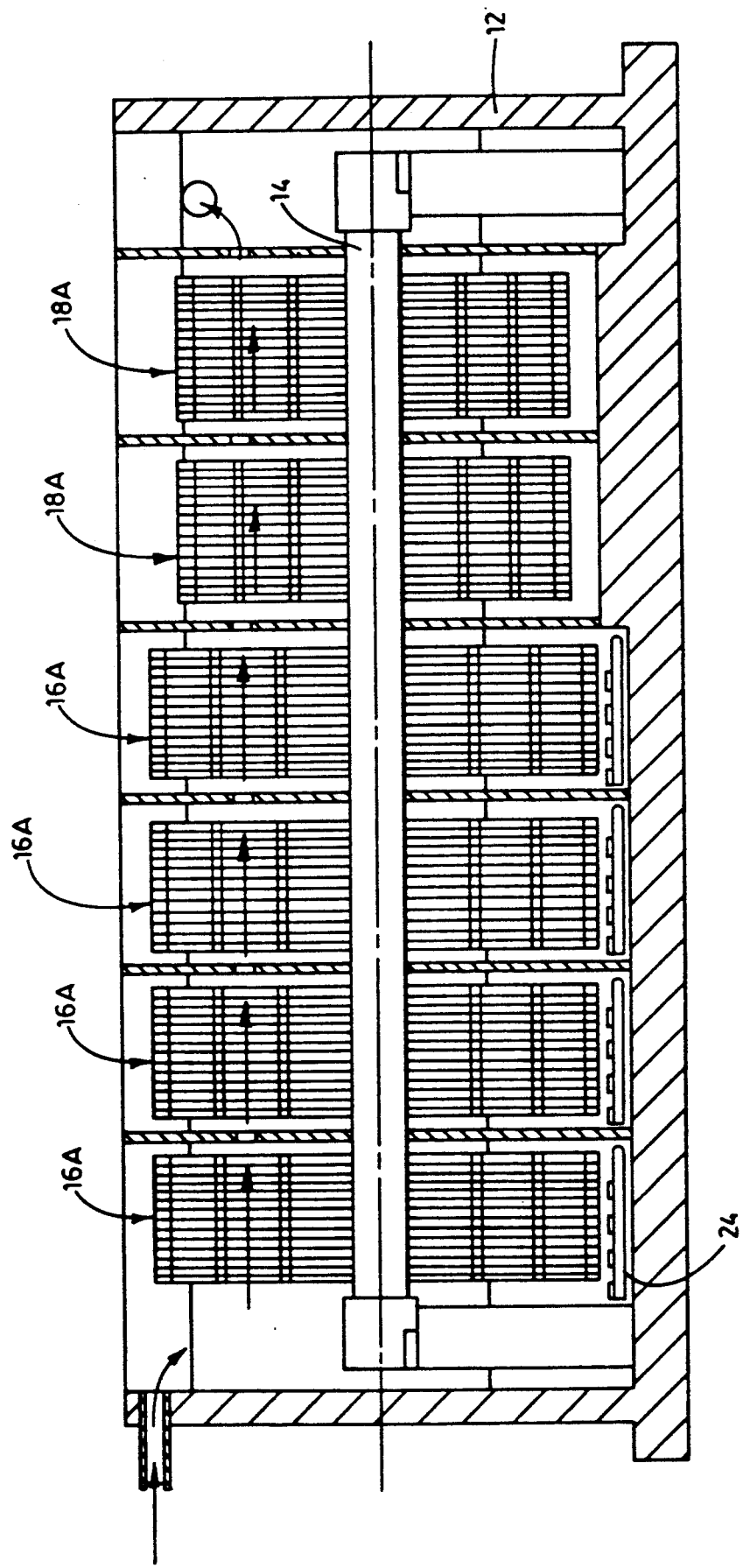
FIG. 2 is a sectional view along line 2—2 of FIG. 1.
Figure 3:
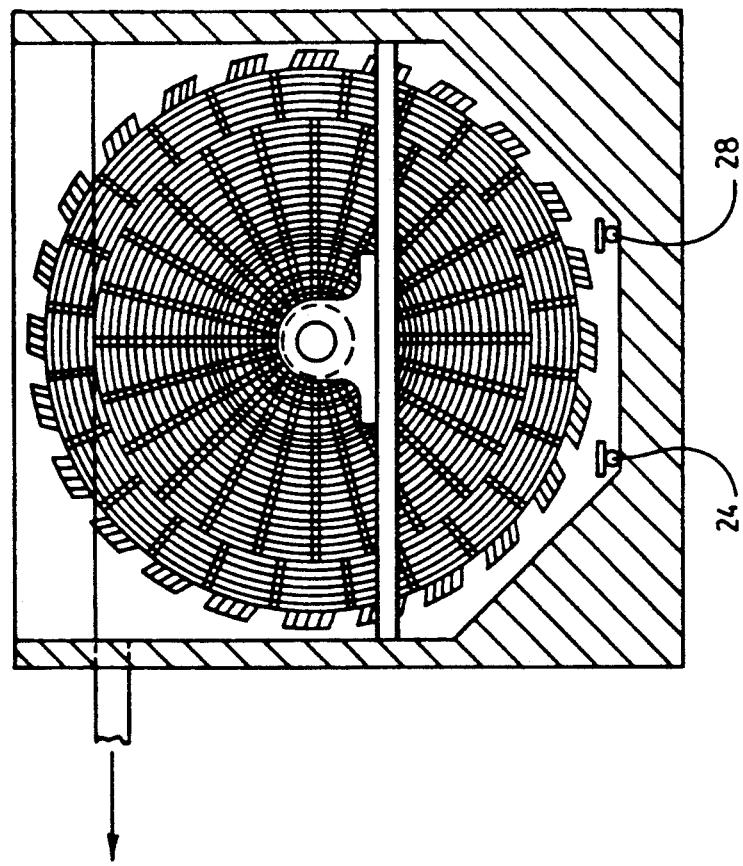
FIG. 3 is a sectional view along line 3—3 of FIG. 3.

The RBC's 16A are part of reactors 16 having a first oxygen content, and the RBC's 18A are part of reactors 18 having a second oxygen content. More particularly, in one embodiment of the invention, the RBC's 16A are part of aerobic reactors 16, and RBC's 18A, which are on the same shaft and are in the same tank as the RBC's 16A, are part of reduced oxygen or anaerobic reactors 18. The aerobic reactors 16 are for removal of carbonaceous $BOD_5$ and for nitrification. The reactors 18 are for denitrification. The RBC's of the aerobic reactors 16 have larger diameters than the RBC's of the reactors 18. When each RBC 16A of the aerobic reactors 16 is partially submerged in wastewater in the tank, each RBC 18A of the reactors 18 (see FIG. 2) is almost completely submerged. Although other ratios of diameters are possible, in the illustrated embodiment, when the aerobic RBC's 16A are 85% submerged, the RBC's 18A are 90–100% submerged.

Also, in the preferred embodiment (see FIGS. 1 and 2), the tank portions 12B are not as wide and not as deep as the tank portions 12A. This is because the diameter of each RBC's 18A is less than the diameter of each of the RBC's 16A, and so as to reduce areas where sludge could accumulate.

Cost savings are achieved as only one tank and only one shaft are needed. The use of RBC's is made more economical for smaller facilities having permit limits for total nitrogen.

Figure 5:
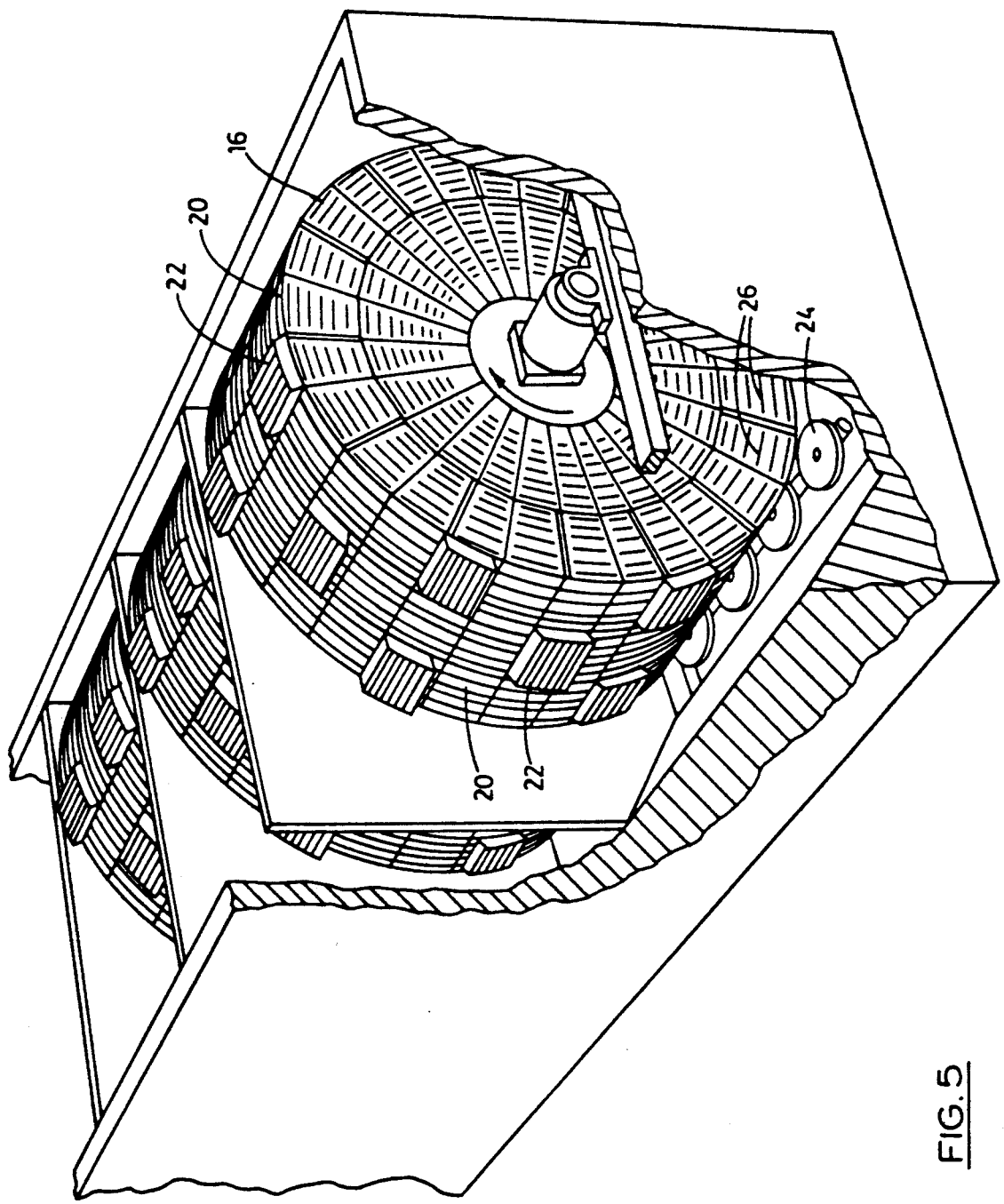
FIG. 5 is a partially broken away perspective view of the wastewater treatment facility shown in FIG. 1.

In one aspect of the invention, the RBC's 16A of the aerobic reactors have respective circumferences 20 with air cups 22 thereon (see FIG. 5), and air is released below those RBC's via respective drive air headers 24 under those RBC's, and rises into the air cups 22 on the RBC's. The captured air exerts a buoyant force which exerts a torque on the RBC's 16A and shaft 14 sufficient for rotation of the RBC's 16A and 18A and the shaft 14. Air cups 22 may, but need not be, provided on the RBC's 18A of the reactors 18. Sufficient rotational torque is provided by the air cups 22 and air headers 24 of the aerobic reactors 16. Air cups 22 and air headers 24, or a motor, or a combination can be used to rotate the shaft 14 and RBC's 16A and 18A.

The RBC's 16A and 18A of the aerobic and reduced oxygen reactors 16 and 18 include radially extending passages 26, and air cups 22 are not provided over the portions of the circumferences 20 that have passages 26 extending radially therefrom, and some air enters the passages and flows upward into the RBC's. The advantage of this is that the air provides turbulence and sloughing and controls the thickness of biofilm on the RBC so that a thinner, more biologically active biofilm remains on the RBC. For the RBC's 16A of the aerobic reactors 16, the air that enters the radially extending passages can be provided via process air headers 28, spaced from the drive air headers 24, and under respective RBC's (dual header aeration). The process aeration controls the growth of biomass on the RBC's above each process air header.

In one embodiment of the invention, aeration is provided to the RBC's 16A of the aerobic reactors, and this produces sufficient torque to rotate both the RBC's 16A and 18A. In the preferred embodiment of the invention, air headers (not shown) are provided below the RBC's 18A of the anaerobic reactors, aligned with and below the shaft 14, and are intermittently (e.g. for 15 seconds each month) operated to control the thickness of biomass on the RBC's 18A.

In one embodiment of the invention (see FIGS. 1 and 2), flow through the tank 12 is in the direction from the reactors 16 to the reactors 18. $BOD_5$ removal and nitrification ($NH_3$—N is converted to $NO_3$—N) occur in the aerobic reactors. The nitrates enter the anaerobic reactors, are oxidized, and release gaseous nitrogen. For this oxidation to occur, a source 30 of soluble carbon (e.g. methanol) is provided upstream of the reactors 18.

Figure 4:
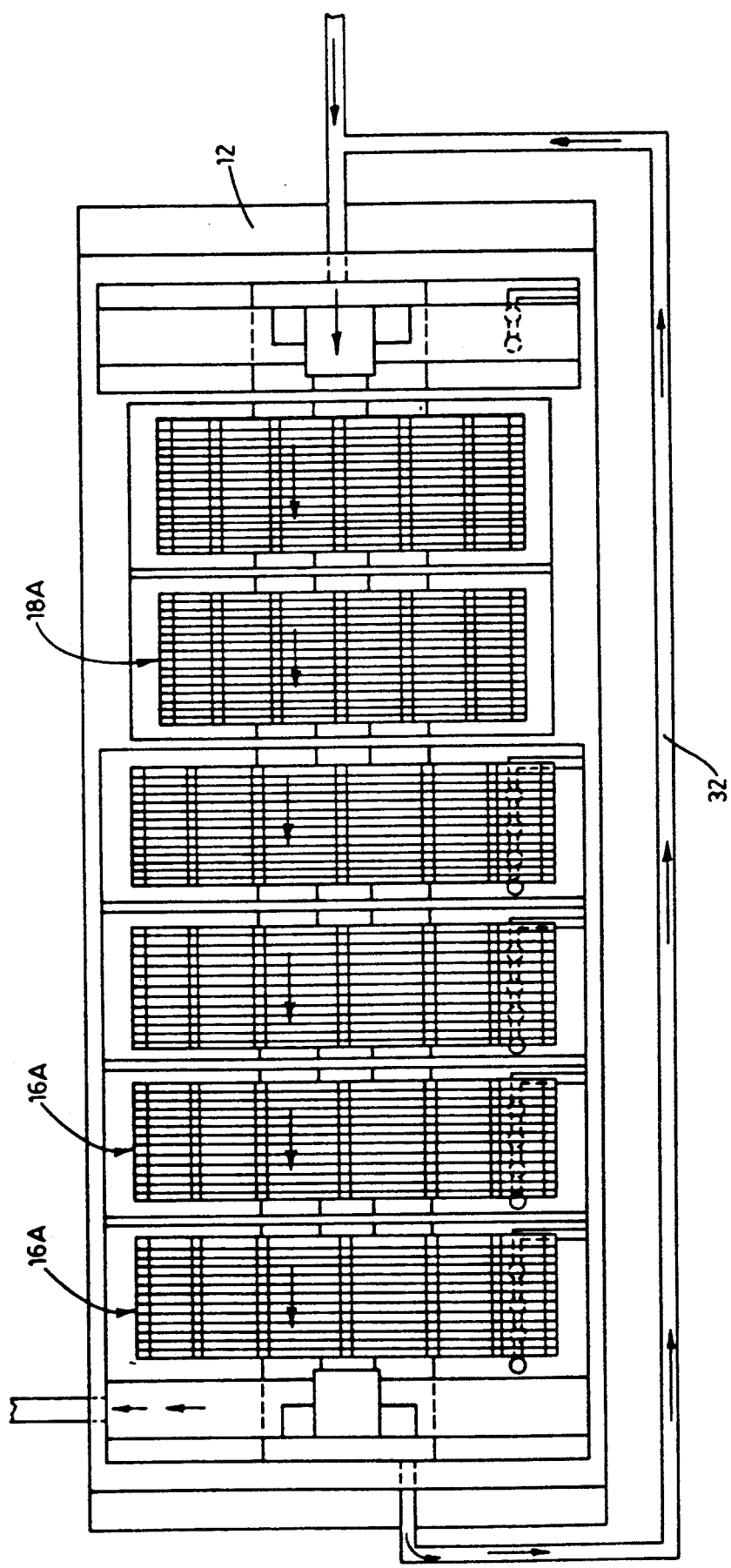
FIG. 4 is a top plan view of a wastewater treatment facility embodying various features of the invention and having an alternative flow scheme to the flow scheme illustrated in FIG. 1.

In another embodiment of the invention (see FIG. 4), flow through the tank 12 is in the direction from the reactors 18 to the aerobic reactors 16. In this embodiment, influent into the reactors 18 includes raw, settled waste which combines with a recycle stream of fluids that have passed through the aerobic reactors, via recycle path 32. In this embodiment, wastewater itself provides the soluble carbon source and no additional soluble carbon source is needed. Therefore, RBC surface area in the aerobic reactors 16 can be reduced. Capacity is provided for a recycle rate of as high as 300–400% recycle.

While a preferred embodiment of the invention has been disclosed, by way of example, various modifications will be apparent to those of ordinary skill in the art. Therefore, the scope of the invention is to be limited only by the scope of the following claims. It should be noted that what has been referred to as a rotating biological contactor (RBC) is referred to as a rotatable biological contactor in the claims below—this is to clarify that it is intended that the scope of the claims not require rotation of these devices.

What is claimed is:

1. A wastewater treatment facility comprising:
   a structure defining first and second tank portions;
   a shaft rotatably supported by said structure;
   a first biological reactor in said first tank portion and including a first rotatable biological contactor supported by said shaft and having a diameter;
   a second biological reactor in said second tank portion and including a second rotatable biological contactor supported by said shaft and having a diameter greater than the diameter of said first rotating biological contactor;
   means for providing a wastewater level in said first biological reactor such that said first rotatable biological contactor is completely submerged in wastewater; and
   means for providing a wastewater level in said second biological reactor such that said second rotatable biological contactor is only partially submerged in wastewater.

2. A wastewater treatment facility as set forth in claim 1 wherein said first and second rotatable biological contactors are fixed to said shaft for rotation with said shaft.

3. A wastewater treatment facility as set forth in claim 2 and further comprising means, other than an electro-mechanical motor, for example a torque to said second rotatable biological contactor.

4. A wastewater treatment facility in accordance with claim 3 wherein said tank contains wastewater, and wherein said torque imparting means comprises circumferentially spaced capture cups on said second rotatable biological contactor and means for dispensing matter, lighter than the wastewater, from under the wastewater into said capture cups.

5. A wastewater treatment facility as set forth in claim 4 wherein said torque imparting means by itself causes said second rotatable biological contactor to rotate and thereby causes said first rotatable biological contactor to rotate.

6. A wastewater treatment facility as set forth in claim 2 wherein said tank contains wastewater, wherein said second rotatable contactor further includes a circumference, and wherein said wastewater treatment facility further includes circumferentially spaced air capture cups on said second rotatable biological contactor, on said circumference, and further comprising dual air header aeration means including a first air header for dispensing air from under the wastewater and directed into said capture cups to impart a torque to said second rotatable contactor, and a second air header spaced from said first air header for dispensing air from under the wastewater to control the thickness of biofilm on the second rotatable contactor.

7. A wastewater treatment facility as set forth in claim 2 wherein said first biological reactor is an anaerobic reactor, and wherein said second biological reactor is an aerobic reactor.

8. A wastewater treatment facility as set forth in claim 1 wherein said first and second tank portions include means for containing wastewater at a level that is the same for the first biological reactor as it is for the second biological reactor but such that the depth of wastewater in said first biological reactor is less than the depth of wastewater in said second biological reactor.

9. A wastewater treatment facility comprising:
a structure defining first and second tank portions each adapted to house wastewater;
a shaft rotatably supported by said structure;
a first biological reactor including a first rotatable biological contactor in said first tank portion, mounted to said shaft for rotation with said shaft, and having a diameter;
means for providing a first oxygen content in said first biological reactor;
a second biological reactor including a second rotatable biological contactor in said second tank portion, mounted to said shaft for rotation with said shaft and having a diameter greater than the diameter of said first rotating biological contactor;
means for providing a second oxygen content in said second biological reactor, said second oxygen content being greater than the first oxygen content;
means for causing wastewater to flow primarily in the direction from said second reactor to said first reactor; and
means for providing soluble carbon upstream of said first reactor.

10. A wastewater treatment facility in accordance with claim 9 wherein said soluble carbon providing means provides methanol upstream of said first reactor.

11. A wastewater treatment facility in accordance with claim 10 wherein said first reactor is an anaerobic reactor, and wherein said second reactor is an aerobic reactor.

12. A wastewater treatment facility as set forth in claim 9 and further comprising means, other than an electro-mechanical motor, for imparting a torque to said second rotatable biological contactor.

13. A wastewater treatment facility in accordance with claim 12 wherein said tank contains wastewater, and wherein said torque imparting means comprises circumferentially spaced capture cups on said second rotatable biological contactor and means for dispensing matter, lighter than the wastewater, from under the wastewater into said capture cups.

14. A wastewater treatment facility as set forth in claim 13 wherein said torque imparting means by itself causes said second rotatable biological contactor to rotate and thereby causes said first rotatable biological contactor to rotate.

15. A wastewater treatment facility as set forth in claim 9 wherein said tank contains wastewater, wherein said second rotatable contactor further includes a circumference, and wherein said wastewater treatment facility further includes circumferentially spaced air capture cups on said second rotatable biological contactor, on said circumference, and further comprising dual air header aeration means including a first air header for dispensing air from under the wastewater and directed into said capture cups to impart a torque to said second rotatable contactor, and a second air header spaced from said first air header for dispensing air from under the wastewater to control the thickness of biofilm on the second rotatable contactor.

16. A wastewater treatment facility as set forth in claim 9 wherein said tank includes means for containing wastewater at a level that is the same for the second reactor as it is for the first reactor.

17. A wastewater treatment facility comprising:
a shaft;
an anaerobic biological reactor including a first tank portion and a first rotatable biological contactor, in said first tank portion, mounted to said shaft for rotation with said shaft and having a diameter;
an aerobic biological reactor including a second tank portion, integral with said first tank portion, and a second rotatable biological contactor, in said second tank portion, mounted to said shaft for rotation with said shaft and having a diameter greater than the diameter of said first rotating biological contactor, said shaft being rotatably supported by said first and second tank portions;
means for causing wastewater to flow primarily in the direction from said anaerobic biological reactor to said aerobic biological reactor; and
means for providing a recycle stream from downstream of said aerobic biological reactor to upstream of said anaerobic biological reactor.

18. A wastewater treatment facility as set forth in claim 17 and further comprising means, other than an electro-mechanical motor, for imparting a torque to said second rotatable biological contactor.

19. A wastewater treatment facility in accordance with claim 18 wherein said tank contains wastewater, and wherein said torque imparting means comprises circumferentially spaced capture cups on said second rotatable biological contactor and means for dispensing matter, lighter than the wastewater, from under the wastewater into said capture cups.

20. A wastewater treatment facility as set forth in claim 19 wherein said torque imparting means by itself causes said second rotatable biological contactor to rotate and thereby causes said first rotatable biological contactor to rotate.

* * * * *